United States Patent [19]
Makioka

[11] Patent Number: 5,539,455
[45] Date of Patent: Jul. 23, 1996

[54] DIGITAL ELECTRONIC STILL-VIDEO CAMERA AND METHOD OF CONTROLLING SAME TO REDUCE POWER CONSUMPTION DURING PLAYBACK

[75] Inventor: Katsuya Makioka, Tokyo, Japan

[73] Assignee: Fuji Photo Film Co., Ltd., Kanagawa, Japan

[21] Appl. No.: 465,180

[22] Filed: Jun. 5, 1995

Related U.S. Application Data

[63] Continuation of Ser. No. 990,710, Dec. 15, 1992, abandoned.

[30] Foreign Application Priority Data

Dec. 16, 1991 [JP] Japan ................... 3-351792

[51] Int. Cl.⁶ ........................... H04N 5/228; H04N 9/89
[52] U.S. Cl. ..................... 348/222; 348/220; 358/310; 358/320; 358/909.1
[58] Field of Search ........................ 348/220, 222, 348/231, 232, 233; 358/310, 312, 313, 320, 321, 906, 909.1; H04N 5/228, 9/89

[56] References Cited

U.S. PATENT DOCUMENTS

| | | | |
|---|---|---|---|
| 4,584,613 | 4/1986 | Amari | 358/310 |
| 4,633,330 | 12/1986 | Yamamitsu | 358/310 |
| 4,774,594 | 9/1988 | Urata | 358/320 |
| 4,837,628 | 6/1989 | Sasaki | 358/209 |
| 4,862,292 | 8/1989 | Enari | 360/8 |
| 4,984,094 | 1/1991 | Emori | 358/335 |
| 5,206,730 | 4/1993 | Sakai | 358/209 |
| 5,229,862 | 7/1993 | Takahashi | 358/335 |

Primary Examiner—Wendy R. Greening
Assistant Examiner—Ngoc-Yen Vu

[57] ABSTRACT

Power consumption in a still-video camera at playback of pixel data is suppressed. Image data indicative of each pixel is written in a frame memory in synchronization with a prescribed clock frequency (14.32 MHz) in a photographic mode. At the time of playback, a clock signal whose frequency (7.16 MHz) is half that of the clock signal in the photographic mode is applied to each circuit block of the camera. The value of the count in an H-direction address counter for outputting address data in the horizontal direction is doubled in a doubler circuit. Data representing the doubled value of the count is applied to a frame memory as horizontal-direction address data. As a result, the frame memory outputs pixel data that is thinned out every other pixel, and the outputted data is sent to a playback processing circuit.

13 Claims, 7 Drawing Sheets

DIGITAL ELECTRONIC STILL-VIDEO CAMERA AND METHOD OF CONTROLLING SAME TO REDUCE POWER CONSUMPTION DURING PLAYBACK

This application is a continuation, of application Ser. No. 07/990,710 filed on Dec. 15, 1992, now abandoned.

BACKGROUND OF THE INVENTION

1. Field of the Invention

This invention relates to a digital electronic still-video camera as well as to a method of controlling the camera.

2. Description of Related Art

A digital electronic still-video camera is a camera of the type which picks up the image of a subject by using a solid-state electronic image pick-up device such as a CCD, converts an analog video signal outputted by the solid-state image pick-up device into digital image data and stores the digital image data on a recording medium such as a memory card. In a case where the image data recorded using the digital electronic still-video camera is played back, use is made of a special-purpose playback apparatus or a digital electronic still-video camera having a playback function.

However, in a case where the digital image data is played back, a current must be passed through a playback circuit during playback, and as a result, a large amount of power is consumed. Reducing the amount of power consumed is essential especially when playback is performed by a digital electronic still-video camera incorporating an internal battery and having a playback function.

SUMMARY OF THE INVENTION

Accordingly, an object of the present invention is to reduce power consumption at the time of playback in a digital electronic still-video camera having a playback function.

According to a first aspect of the present invention, the foregoing object is attained by providing a video camera having a recording mode in which pixel image data obtained by picking up an image of a subject is stored in storage means and a still image playback mode in which the pixel image data is read from the storage means for playing back a still image, comprising reading means which operates in synchronization with an input clock signal and on the basis of a predetermined address signal for thinning out reading the pixel image data from the storage means, the reading means including address signal generating means for counting the input clock signal to generate a count value and multiplying the count value by a positive whole number to produce an address signal when the still image playback mode is set, playback processing means which operates in synchronization with the input clock signal for applying still image playback processing to the pixel image data read by the reading means, and clock signal generating means for generating a clock signal having a period which is a positive whole-number multiple of a period of a clock signal used in the recording mode, and applying the clock signal to the reading means and playback processing means when the still image playback mode is set.

According to a first aspect of the present invention, the foregoing object is attained by providing a method of controlling a video camera having a recording mode in which pixel image data obtained by picking up an image of a subject is stored in storage means and a still image playback mode in which the pixel image data is read from the storage means for playing back a still image, comprising a step of thinning out and reading pixel image data from the storage means by reading means which operates in synchronization with an input clock signal and on the basis of a predetermined address signal, counting said input clock signal to generate a count value and multiplying said count value by a positive whole number by address signal generating means included in said reading means to produce an address signal when the still image playback mode is set, applying still image playback processing by playback processing means which operates in synchronization with said input clock signal to the pixel image data read by said reading means, generating a clock signal having a period which is a positive whole-number multiple of a period of a clock signal used in the recording mode, and applying said clock signal to said reading means and said playback processing means, when the still image playback mode is set.

The power consumed by the digital circuitry is substantially linearly proportional to the frequency of the input clock signal which operates the digital circuitry. As a consequence, if the digital circuitry is operated using a low-frequency clock signal, the power consumed can be reduced.

In accordance with the first aspect of the invention, the pixel image data that has been recorded on the storage means is read while being thinned out. Playback processing is executed by driving the playback processing means and the reading means using a clock signal having a frequency of which is low in comparison with that at the time of photography, and which conforms to the pixel image data read.

Thus, in accordance with the first aspect of the invention, the pixel image data is thinned out and read from the storage means. The reading means and the playback processing means, therefore, are operated by a clock signal whose frequency is in conformity with the pixel image data read. Since the clock signal has a frequency lower than that of the clock signal which prevails when all of the pixel image data composed of the normal number of pixels is read and reproduced from the storage means the amount of power consumed can be reduced.

According to a second aspect of the present invention, the foregoing object is attained by providing a video camera having a recording mode in which pixel image data obtained by picking up an image of a subject is stored in storage means and a still image playback mode in which the pixel image data is read from the storage means for playing back a still image, comprising clock signal generating means for outputting a clock signal having a period which is a positive whole-number multiple of a period of a clock signal utilized in the recording mode, when the still image playback mode is set reading means which operates in synchronization with the clock signal outputted by the storage means the pixel image data in increments of mutually adjacent pixels the number of which is the positive whole-number multiple, averaging means for averaging the pixel image data read by the reading means, and playback means for performing playback processing of the pixel image data averaged by the averaging means, when the still image playback mode is set.

According to the second aspect of the present invention, the foregoing object is attained by providing a method of controlling a video camera having a recording mode in which pixel image data obtained by picking up an image of a subject is stored in storage means and a still image playback mode in which the pixel image data is read from the storage means for playing back a still image, comprising a step of outputting a clock signal having a period which is a positive whole-number multiple of a period of a clock signal utilized in the recording mode by clock signal generating means, when the still image playback mode is set a step of reading signal image data from the storage means by reading means, in synchronization with the clock signal outputted in increments of mutually adjacent pixels the number of which is the positive whole-number multiple, a step of averaging the pixel image data read when the still image playback mode is set, and a step of performing playback processing of the image pixel data averaged when the still image playback mode is set.

In accordance with the second aspect of the invention, a clock signal is outputted having a period which is a positive whole-number multiple of a period of a clock signal that prevails in a case where pixel image data, which is composed of a normal number of pixels recorded on the storage means is read one pixel at a time. This clock signal is applied to the reading means, which reads the pixel image data in increments of a whole number of mutually adjacent pixels. The pixel image data read is averaged, treated as one item of pixel image data and subjected to playback processing.

Thus, in accordance with the second aspect of the present invention, the pixel image data is read in increments of a whole number of mutually adjacent pixels, and the clock signal becomes one having a period which conforms to this reading operation and which is a positive whole-number multiple of the period of a clock signal that prevails in a case where pixel data, which is composed of the normal number of pixels recorded on a recording medium, is read one pixel at a time. Accordingly, the frequency of the clock signal is lower than that of the clock signal which prevails when reading and playing back the pixel image data, which is composed of the normal number of pixels, from the storage means. This makes it possible to suppress power consumption.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
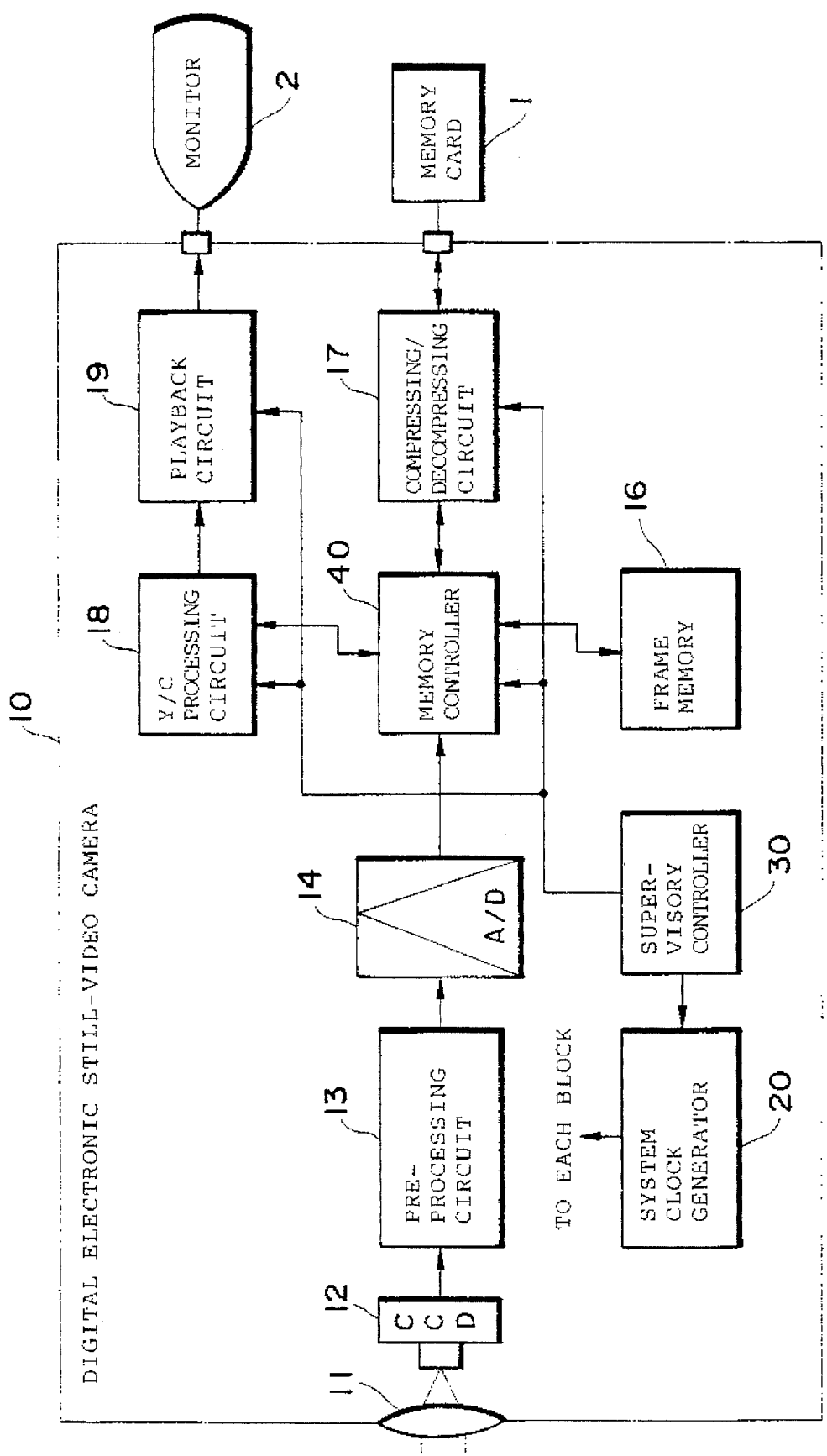
FIG. 1 is a block diagram illustrating the electrical configuration of a digital electronic still-video camera common to first and second embodiments of the present invention.

FIG. 1 is a block diagram illustrating the electrical configuration of a digital electronic still-video camera embodying the present invention.

The overall operation of a digital electronic still-video camera 10 is supervised by a supervisory controller 30. Each circuit block contained in the digital electronic still-video camera 10 is operated in synchronization with a system clock outputted by a system clock generating circuit 20. The digital image data is written in a frame memory 16 and read from the frame memory 16 by a memory controller 40. Pixel data that has been stored in the frame memory 16 can be read from the frame memory 16 fully by the memory controller 40, read while the pixel data is thinned out (as in a first embodiment, described later), or read in such a manner that data of two mutually adjacent pixels are read simultaneously (as in a second embodiment, described later).

In a photographic mode (or recording mode) in which a subject is imaged and image data obtained by such imaging is recorded on a memory card 1, the system clock generating circuit 20 outputs a clock signal having a frequency of 14.32 MHz, and each circuit block operates in synchronization with this clock signal.

The image of the subject is formed on a CCD 12 by an imaging lens 11, and the CCD 12 outputs an analog video signal which represents the image of the subject. The analog video signal is applied to a preprocessing circuit 13, which is a circuit for executing such processing as amplification of the analog video signal inputted thereto and so on. The analog video signal outputted by the preprocessing circuit 13 is applied to an analog/digital (A/D) converting circuit 14, where the signal is converted into a digital image data.

Figure 2:
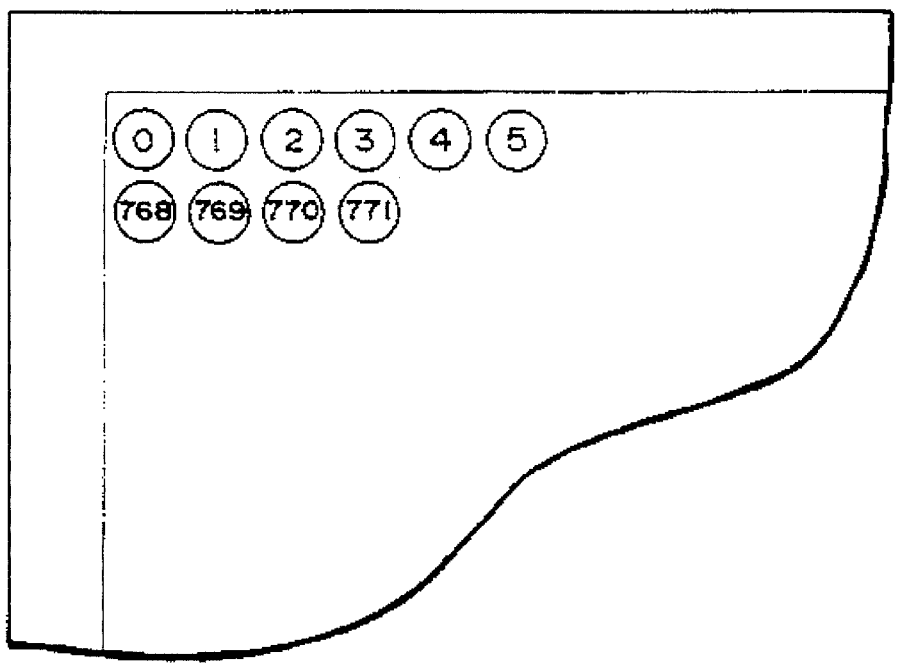
FIG. 2 is a diagram schematically showing an array of pixels corresponding to pixel data stored in a frame memory.

The digital image data converted by the A/D converting circuit 14 is stored temporarily in the frame memory 16 under the control of the memory controller 40. The digital image data stored in the frame memory 16 is applied to a luminance-data/chrominance-data (Y/C) processing circuit 18, which separates the image data into luminance data and chrominance data. The digital image data including the luminance data and chrominance data is applied to and stored in the frame memory 16 again. The array of pixel data that has been stored in the frame memory 16 is illustrated schematically in FIG. 2. In this example, 768 pixels are present in the horizontal direction (on one horizontal line).

The digital image data stored in the frame memory 16 is read out again and applied to a compressing/decompressing circuit 17. The compressing/decompressing circuit 17 is a circuit which executes processing for compressing data by DCT (direct cosine transformation), Huffman coding or run-length coding, as well as processing for decompressing (expanding) the compressed digital image data through a procedure which is the reverse of that of the compressing processing. The digital image data subjected to data compression by the compressing/decompressing circuit 17 is applied to the memory card 1, where the data is recorded in a predetermined area thereof.

When the digital image data that has been recorded on the memory card 1 is reproduced (the playback mode), the system clock generating circuit 20 outputs a clock signal having a frequency of 7.16 MHz, and each circuit block operates in synchronization with this clock signal.

In the playback mode, the digital image data is read out of the memory card 1 and applied to the compressing/decompressing circuit 17. When the data is decompressed by the compressing/decompressing circuit 17, the decompressed image data is stored in the frame memory 16 again under the control of the memory controller 40.

Under the control of the memory controller 40, the digital image data stored in the frame memory 16 is read out while the pixel data is thinned out (the first embodiment), or the data composed of mutually adjacent pixels that have been read out is averaged (the second embodiment).

Figure 3:
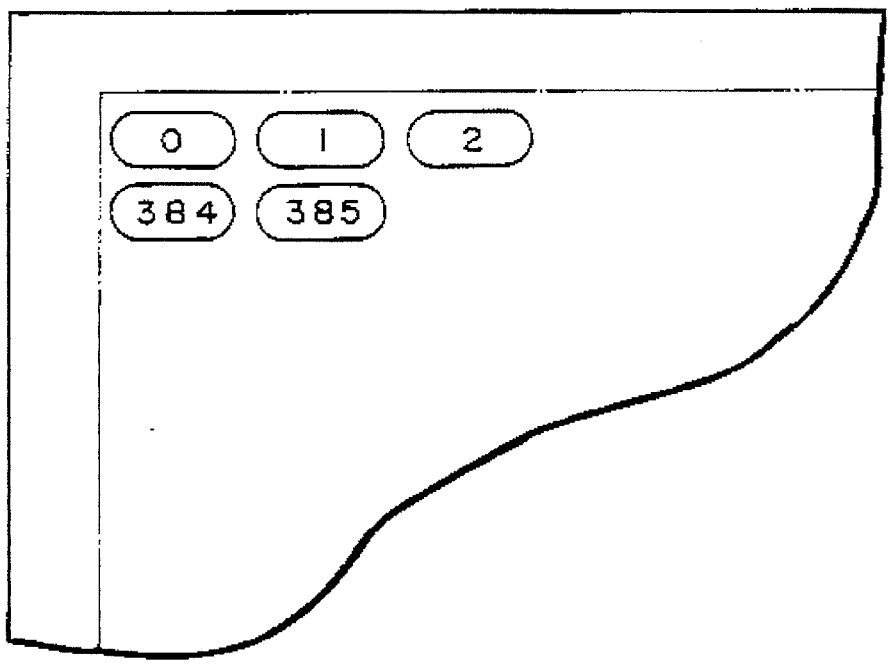
FIG. 3 is a diagram schematically showing an array of pixels at the time of playback.

The array of pixel data read out of the frame memory 16 is shown schematically in FIG. 3. In this example, 384 pixels are present in the horizontal direction at the time of playback. In either case, in the playback mode, the number of pixels is less than the number of pixels in the photographic mode, and the frequency of the clock signal applied to each circuit block also is less than in the photographic mode.

The digital image data read out of the frame memory 16 is applied to a playback circuit 19 through the Y/C processing circuit 18. The playback circuit 19 is a circuit which converts the digital image data inputted thereto into an analog video signal and then amplifies the analog signal. The analog video signal outputted by the playback circuit 19 is applied to a monitor display unit 2, where the signal is visually displayed.

Figure 4:
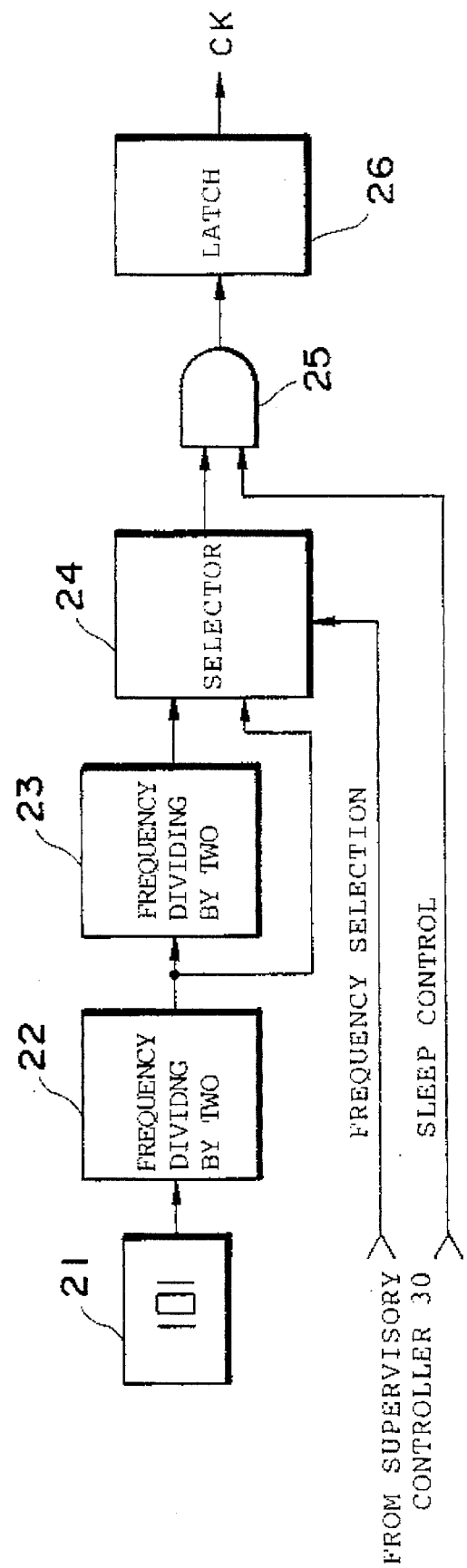
FIG. 4 is a block diagram illustrating an example of the construction of a system clock generating circuit.

A block diagram of the details of the system clock generating circuit 20 is shown in FIG. 4.

The system clock generating circuit 20 includes a quartz oscillator 21 having an oscillation frequency of 28.64 MHz. The output of the quartz oscillator 21 is applied to a divide-by-two frequency dividing circuit 22, which converts this signal into a clock signal having a frequency of 14.32 MHz. The output of the frequency-dividing circuit 22 is applied to one input of a selector 24 and to a divide-by-two frequency dividing circuit 23. The latter outputs a clock signal having a frequency of 7.16 MHz, which is applied to the other input of the selector 24.

A frequency selection signal (or a mode setting signal) from the supervisory controller 30 is applied to the selector 24. In the photographic mode, the clock signal having the frequency of 14.32 MHz outputted by the frequency dividing circuit 22 is delivered by the selector 24..In the playback mode, on the other hand, the clock signal having the frequency of 7.16 MHz outputted by the frequency dividing circuit 23 is delivered by the selector 24. The output of the selector 24 is applied to an AND gate 25. The AND gate 25 is provided with a sleep-control signal from the supervisory controller 30. A clock signal CK is outputted by the system clock generating circuit 20 only during the time that the sleep-control signal is being outputted. The clock signal CK is outputted via a latch circuit 26 upon having passed through the AND gate 25.

Figure 5:
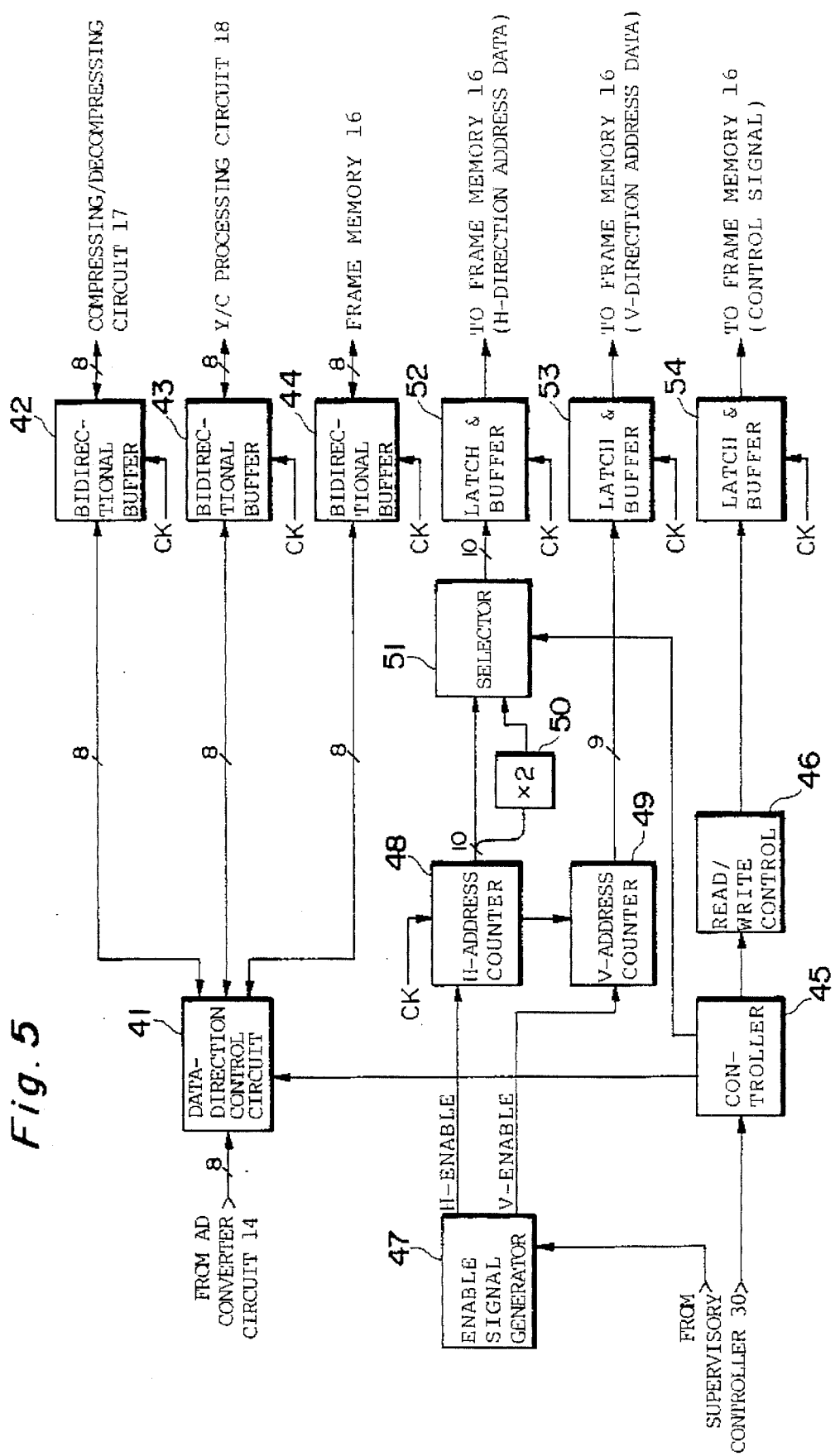
FIG. 5 is a block diagram showing an example of the construction of a memory controller according to the first embodiment.

FIG. 5 illustrates the construction of the memory controller 40 according to the first embodiment, in which pixel data that has been stored in the frame memory 16 is read while being thinned out.

The memory controller 40 includes a data-direction control circuit 41 and bidirectional buffers 42, 43 and 44 in order to transfer the digital image data. The memory controller 40 further includes a read/write control circuit 46 for writing the digital image data in the frame memory 16 and reading this data out of the frame memory 16, an enable-signal generating circuit 47 which outputs an H-direction enable signal for the recording and writing of pixel data in the direction of the horizontal scanning lines and a V-direction enable signal for the recording and writing of pixel data in the direction of the vertical scanning lines, an H-direction address counter 48, a V-direction address counter 49, a doubling circuit 50, a selector 51, and latch buffer circuits 52, 53, and 54. Also included is a control circuit 45 for controlling the overall operation of the memory controller 40.

In the photographic mode, the digital image data outputted by the A/D converting circuit 14 is applied to the frame memory 16 through the data-direction control circuit 41 and bidirectional buffer 44. The read/write control circuit 46 outputs a write-control signal, which is applied to the frame memory 16 via the latch buffer circuit 54. The enable-signal generating circuit 47 outputs the H-direction enable signal and the V-direction enable signal, which are applied to the H-direction address counter 48 and V-direction address counter 49, respectively. When these enable signals enter the H-direction address counter 48 and V-direction address counter 49, the H-direction and V-direction address counters 48 and 49 start to count the clock signals inputted thereto. More specifically, the H-direction address counter 48 counts the input clock signal CK and generates an output signal when the value of the count becomes equal to 768 (the number of pixels in the horizontal direction). This output signal is applied to the V-direction address counter 49, which counts this output signal.

The output data representing the value of the count in the H-direction address counter 48 is applied to one input of the selector 51 and the doubler circuit 50. The output of the doubler circuit 50 is applied to the other input of the selector 51. In the photographic mode, the data representing the value counted by the H-direction address counter 48 is applied as is to the latch and buffer circuit 52 through the selector 51, and this data is supplied from the latch and buffer circuit 52 to the frame memory 16 as address data in the horizontal direction. The data representing the value counted by the V-direction address counter 49 is applied to the latch and buffer circuit 53, whence this data is supplied to the frame memory 16 as address data in the vertical direction. The digital image data outputted by the bidirectional buffer 44 is stored in a location of the frame memory 16 having the address specified by the address data outputted by the latch and buffer circuits 52 and 53.

Figure 6:
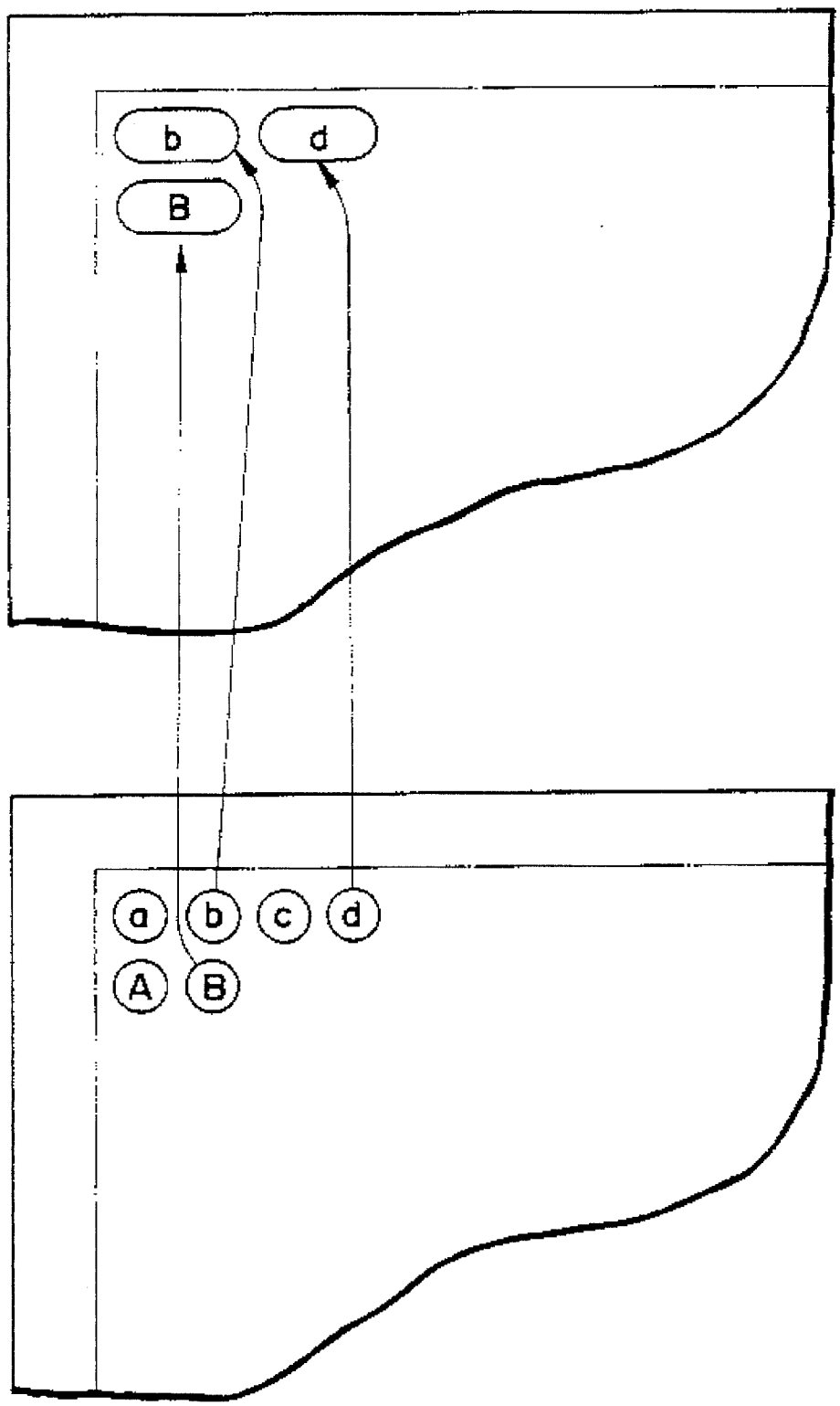
FIG. 6 illustrates the manner in which pixels are thinned out and played back by the memory controller shown in FIG. 5.

In the playback mode, the image data read from the frame memory 16 is applied to the Y/C processing circuit 8 via the bidirectional buffer 44, the data-direction control circuit 41 and the bidirectional buffer 43. Further, a read-control signal is outputted by the read/write control circuit 46 and is applied to the frame memory 16 via the latch buffer circuit 54. The H-and V-direction enable signals are outputted by the enable signal generating circuit 47 in order to generate the H-direction and V-direction address data, and H- and V-direction enable signals start to be counted by the address counters 48 and 49, respectively. In the playback mode, the H-direction address counter 48 generates an output signal when the value of its count reaches 384. Further, the selector 51 is controlled in such a manner that the output of the doubler circuit 50 is applied to the frame memory 16, via the latch and buffer circuit 52, as horizontal-direction address data. As a result, as illustrated in the lower half of FIG. 6, pixel data is outputted by the frame memory 16 while every other pixel is thinned out in the horizontal direction. The read pixel data is applied to the playback circuit 19 through the Y/C processing circuit 18. The pixel data thinned out and read is treated as image data representing two pixels that are mutually adjacent in the horizontal direction, as shown in the upper half of FIG. 6.

In the playback mode, each circuit is operated by a clock signal having a frequency which is half that of the clock signal in the photographic mode. This makes it possible to keep the amount of power consumed low in the playback mode.

Figure 7:
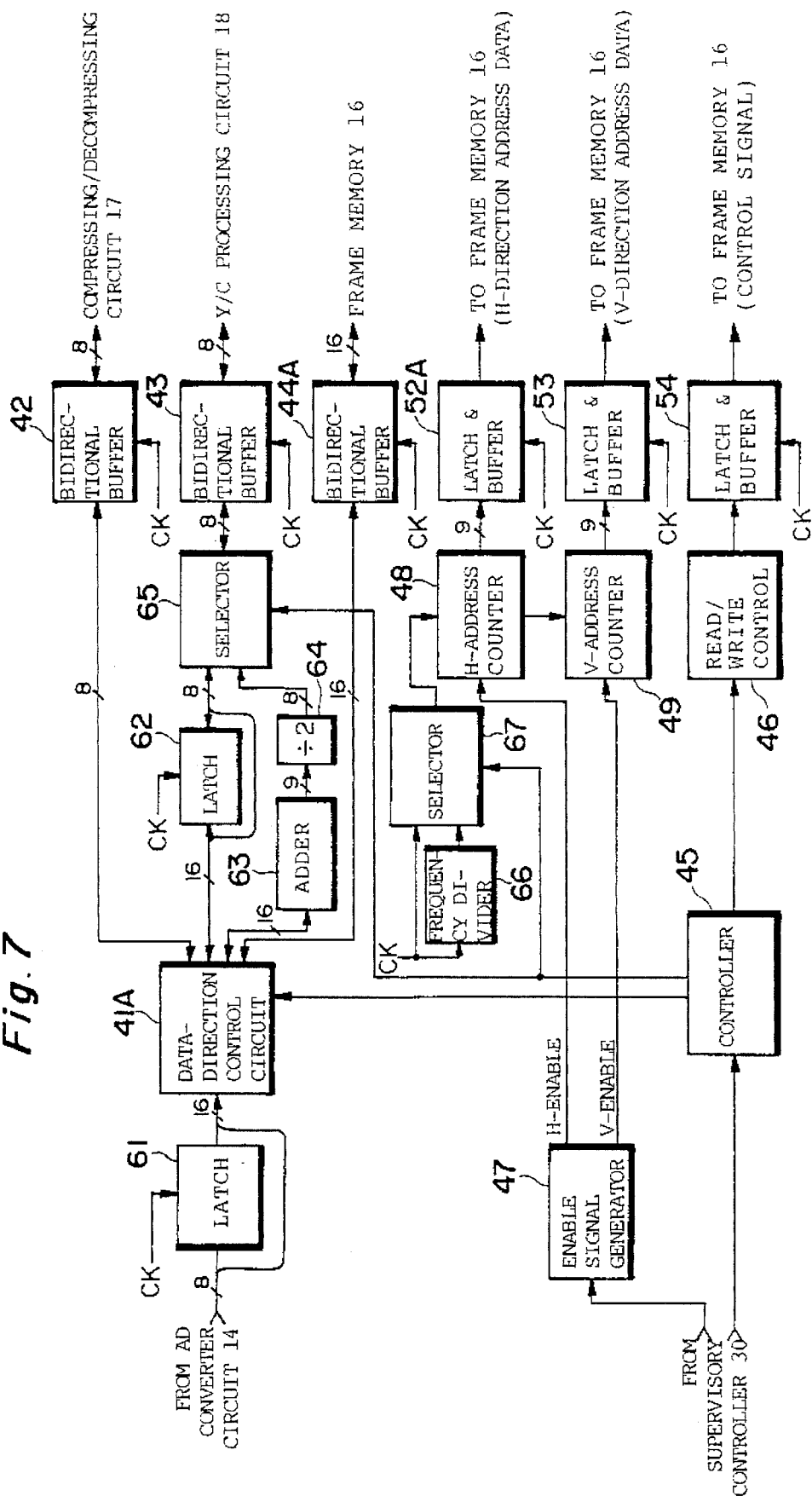
FIG. 7 is a block diagram illustrating another example of the construction of a memory controller according to the second embodiment.

FIG. 7 illustrates the construction of the memory controller 40 according to the second embodiment, in which pixel data of two pixels that are mutually adjacent in the horizontal direction are read from the frame memory 16 simultaneously, the arithmetic mean of the read pixel data is calculated and playback processing is performed treating this arithmetic mean as data composed of one pixel. In FIG. 7, components identical with those shown in FIG. 5 are designated by like reference characters and need not be described again.

The frame memory 16 utilized in the memory controller 40 illustrated in FIG. 7 is a 16-bit memory. In this memory controller 40, data composed of two pixels each of 5 eight bits is converted into data composed of two pixels of 16 bits, and the resulting data is applied to the frame memory 16 so that data composed of two pixels is stored at one time. Further, the 16-bit data stored in the frame memory 16 is converted into data composed of two pixels of eight bits, and the resulting data is applied to the Y/C processing circuit 18.

The memory controller 40 depicted in FIG. 7 includes, in addition to components from the memory controller 40 shown in FIG. 5, latch circuits 61 and 62, an adder circuit 63, a divider circuit 64 and a selector 65. Also provided are a frequency dividing circuit 66 and a selector 67.

In the photographic mode, the clock signal generating circuit 20 generates a 14.32 MHz clock signal applied to each circuit block. The A/D converting circuit 14 outputs pixel data of eight bits per pixel, which data is applied to the memory controller 40. The pixel data which has entered the memory controller 40 is latched in the latch circuit 61 for one period of the clock signal and is then combined with the pixel data of the next pixel, whereby a conversion is effected into two pixels of pixel data composed of 16 bits. This 16-bit pixel data is applied to the frame memory 16 via a data-direction control circuit 41A and a bidirectional buffer 44A.

The memory controller 40 outputs address data in order that the 16 bits of pixel data may be stored in the frame memory 16. The selector 67 is provided with the 14.32 MHz clock signal CK outputted by the clock signal generating circuit 20, and with a 7.16 MHz clock signal, which is obtained by frequency-dividing the 14.32 MHz clock signal CK using the frequency dividing circuit 66. In the photographic mode, the selector 67 is controlled in such a manner that the clock signal outputted by the frequency dividing circuit 66 will be applied to the H-direction address counter 48. As a consequence, the H-direction address counter 48 performs counting at an interval twice that which prevails when the 14.32 MHz clock signal is applied. Accordingly, two pixels of 16-bit data are written in the frame memory 16. Regardless of the mode, the H-direction address counter 48 generates an output signal when the value of its count reaches 384, and this signal is applied to the V-direction address counter 49.

In a case where the pixel data written in the frame memory 16 is transferred to the Y/C processing circuit 18 in order to be recorded on the memory card 1, the 16-bit pixel data is read from the frame memory 16 and applied to the data-direction control circuit 41A through the bidirectional buffer 44A. Among the 16 bits of image data outputted by the data-direction control circuit 41A, eight bits of the pixel data are applied to one input of the selector 65 through the latch circuit 62 (the latch circuit 62 delays this data by a time equivalent to one period of the clock). The remaining eight bits of pixel data are applied to the other input of the selector 65 without passing through the latch circuit 62. As a result, the 16 bit data of two pixels is converted into eight-bit data of one pixel each. The pixel data converted into eight bits is applied to the Y/C processing circuit 18 through the selector 65 and bidirectional buffer 43.

When the pixel data is written in the frame memory 16 from the Y/C processing circuit 18, the eight-bit pixel data from the Y/C processing circuit 18 is applied to the memory controller 40, where the pixel data is sent through the bidirectional buffer 43 and selector 65 and delayed by the latch circuit 62 for one period of the clock signal before being inputted to the data-direction control circuit 41A. The succeeding eight-bit pixel data is applied to the data-direction control circuit 41A without passing through the latch circuit 62. Thus, 16-bit data is formed from the preceding eight-bit data latched by the latch circuit 62 for one period of the clock signal and the succeeding eight-bit data that is not latched. The 16-bit data resulting from the conversion is applied to the frame memory 16 via the data-direction control circuit 41A and bidirectional buffer 44A, whereby the data is stored in the frame memory 16.

Figure 8:
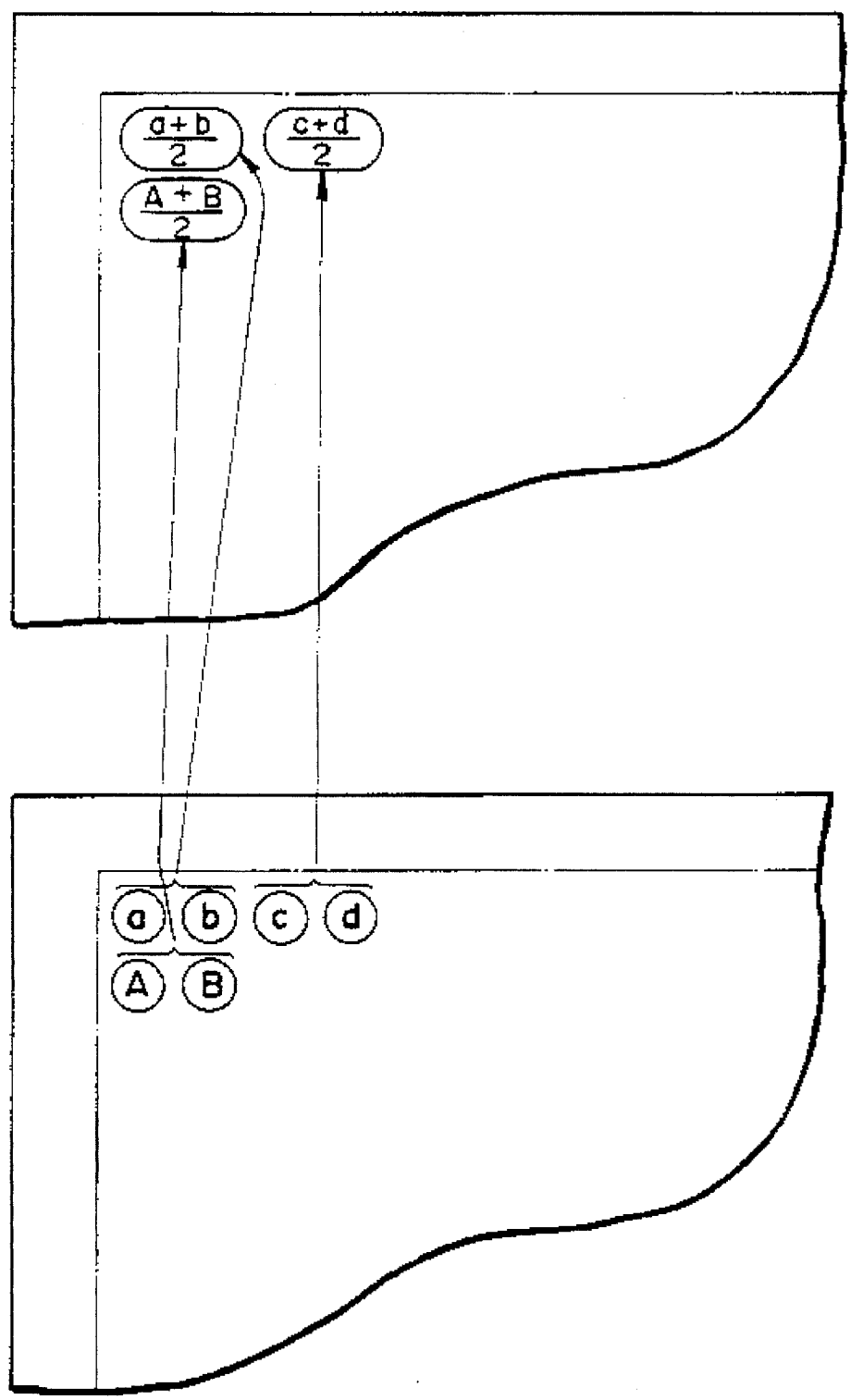
FIG. 8 illustrates the manner in which the arithmetic mean is taken of mutually adjacent pixels followed by playback by the memory controller shown in FIG. 7.

In the playback mode, the clock signal generating circuit 20 outputs the 7.16 MHz clock signal CK, which is applied to each circuit block. The 16-bit pixel data is read from the frame memory 16 and applied to the adder circuit 63 via the bidirectional buffer 44A and data-direction control circuit 41A. The higher-order eight-bit data and the lower-order eight-bit data of the inputted 16-bit data are added to each other in the adder circuit 63. The pixel data resulting from this addition is applied to the divider circuit 64, where processing is performed to divide the data by two. Owing to the operations performed by the adder circuit 63 and divider circuit 64, data of a pixel representing the arithmetic mean of mutually adjacent pixels is obtained, as illustrated schematically in FIG. 8. In the playback mode, the selector 65 selects the adder circuit 63 and the divider circuit 64. The pixel data outputted by the divider circuit 64 is applied to the Y/C processing circuit 18 through the selector 65 and bidirectional buffer 43, and the output of the Y/C processing circuit 18 is inputted to the playback circuit 19. Here playback processing is applied to produce an analog video signal that is then applied to the monitor display unit 2, whereby the signal is visually displayed.

In the playback mode, the 7.16 MHz clock signal outputted by the clock signal generating circuit 20 is applied to the H-direction address counter 48 through the selector 67, and the data representing the value of the count is applied to the frame memory 16, via the latch buffer circuit 52A, as H-direction address data.

With the arrangement of the memory controller 40 shown in FIG. 7, the frequency (e.g., 7.16 MHz) of the clock signal in the playback mode need only be half that (e.g. 14.32 MHz) of the clock signal in the photographic mode, thus making it possible to reduce the power consumption at the time of playback.

As many apparently widely different embodiments of the present invention can be made without departing from the spirit and scope thereof, it is to be understood that the invention is not limited to the specific embodiments thereof except as defined in the appended claims.

What is claimed is:

1. A video camera having a recording mode in which pixel image data obtained by picking up an image of a subject is stored in storage means and a still image playback mode in which the pixel image data is read from the storage means for playing back a still image, comprising:

reading means which operates on the basis of an address signal for thinning out and reading the pixel image data from the storage means, said reading means including address signal generating means for counting an input clock signal to generate a count value in a horizontal direction and multiplying said count value by a whole-number greater than one to produce said address signal when the still image playback mode is set;

playback processing means for applying still image playback processing to the pixel image data read by said reading means; and clock signal generating means for generating said input clock signal having a period which is a greater than one whole-number multiple of a period of a clock signal used in the recording mode, and applying said input clock signal to said reading means and said playback processing means, when the still image playback mode is set;

wherein when the still image playback mode is set, said reading means and said playback processing means operate in synchronization with said input clock signal generated by the clock signal generating means.

2. A video camera in accordance with claim 1, further comprising a controller for controlling operation of said reading means, said address signal generating means, said playback processing means and said clock signal generating means.

3. A video camera in accordance with claim 1, wherein said reading means comprises a read/write controller for outputting a read control signal to the storage means.

4. A video camera in accordance with claim 1, wherein said address signal generating means comprises a doubler circuit for multiplying said count value.

5. A video camera in accordance with claim 4, wherein said address signal generating means comprises an H-address counter and an V-address counter, and a selector for selecting between an output of said H-address counter in the recording mode and an output of said doubler circuit in the still image playback mode.

6. A method of controlling a video camera having a recording mode in which pixel image data obtained by picking up an image of a subject is stored in storage means and a still image playback mode in which the pixel image data is read from the storage means for playing back a still image, comprising the steps of:

(a) thinning out and reading pixel image data from the storage means by reading means which operates on the basis of an address signal;

(b) counting an input clock signal in a horizontal direction to generate a count value and multiplying said count value by a whole number greater than one by address signal generating means included in said reading means to produce said address signal when the still image playback mode is set;

(c) applying still image playback processing by playback processing means to the pixel image data read by said reading means;

(d) generating said input clock signal having a period which is a greater than one whole-number multiple of a period of a clock signal used in the recording mode, when the still image playback mode is set; and (e) applying said input clock signal to said reading means and said playback processing means, when the still image playback mode is set;

wherein when the still image playback mode is set, said thinning out and reading step (a) and said applying step (c) operate in synchronization with said input clock signal generated at said generating step (d).

7. A video camera having a recording mode in which pixel image data obtained by picking up an image of a subject is stored in storage means and a still image playback mode in which the pixel image data is read from the storage means for playing back a still image, comprising:

clock signal generating means for outputting a clock signal having a period which is a greater than one whole-number multiple of a period of a clock signal utilized in the recording mode, when the still image playback mode is set;

reading means for reading from the storage means the pixel image data in increments of mutually adjacent pixels the number of which is said whole-number multiple;

averaging means for averaging said pixel image data incrementally read by said reading means; and playback means for performing playback processing of the image pixel data averaged by said averaging means, when the still image playback mode is set;

wherein when the still image playback mode is set, said reading means, said averaging means and said playback means operate in synchronization with said clock signal output by said clock signal generating means.

8. A video camera in accordance with claim 7, further comprising a controller for controlling operation of said clock signal generating means, said reading means, said averaging means and said playback means.

9. A video camera in accordance with claims 7, wherein said averaging means includes:

an adder for adding higher-order bits of the pixel image data with lower-order bits of the pixel image data; and a divider for dividing the data added by said adder.

10. A video camera in accordance with claim 7, further comprising a frequency divider for frequency dividing said clock signal utilized in the recording mode.

11. A video camera in accordance with claim 10, further comprising a selector for selecting between said clock signal frequency divided by said frequency divider in the still image playback mode and said clock signal in the recording mode.

12. A method of controlling a video camera having a recording mode in which pixel image data obtained by picking up an image of a subject is stored in storage means and a still image playback mode in which the pixel image data is read from the storage means for playing back a still image, comprising the steps of:

(a) outputting a clock signal having a period which is a greater than one whole-number multiple of a period of a clock signal, utilized in the recording mode by clock signal generating means, when the still image playback mode is set;

(b) reading pixel image data from the storage means by reading means, in increments of mutually adjacent pixels the number of which is said whole-number multiple;

(c) averaging the pixel data read at said step (b) by averaging means; and (d) performing playback processing of the pixel image data averaged at said step (c), when the still image playback mode is set;

wherein when the still image playback mode is set, said reading, averaging and performing steps (b)–(d) operate in synchronization with said clock signal outputted at said outputting step (a).

13. A video camera comprising:

image pick-up means, which includes a solid-state image pick-up device for picking up an image of a subject, for outputting image data which represents said image of the subject;

recording means for storing said image data, which is outputted by said image pick-up means, in a storage means;

playback means for reading the image data from said storage means and subjecting said image data to still image reproduction processing and having a recording mode in which said image pick-up means and said recording means are operated and a still image playback mode in which said playback means is operated;

clock-signal generating means capable of generating a clock signal having a comparatively high frequency and a clock signal having a comparatively low frequency, said clock-signal generating means including frequency selecting means for selecting said high frequency when the recording mode is set and for selecting said low frequency when said still image playback mode is set, said high frequency being a greater than one whole-number multiple of said low frequency;

image reducing means, included in said playback means, for reducing the number of pixels of the image represented by the image data read out of said storage means, a reduction ratio being used that is equal to a ratio of said comparatively high frequency to said comparatively low frequency; and control means for controlling said clock generating circuit means and said image reducing means in such a manner that said clock signal having said comparatively high frequency is selectively outputted from said clock-signal generating circuit means in said recording mode, and said clock signal having said comparatively low frequency is selectively outputted from said clock-signal generating circuit means and said image reducing means becomes active in said still image playback mode;

wherein when said still image playback mode is set, said playback means and said image reducing means operate in synchronization with said low frequency output from said clock-signal generating means.

* * * * *